United States Patent
Lopez

(10) Patent No.: US 6,620,349 B1
(45) Date of Patent: Sep. 16, 2003

(54) FIRE RETARDANT COMPOSITIONS AND METHODS FOR PRESERVING WOOD PRODUCTS

(76) Inventor: Richard A. Lopez, 24683 Santa Clara Ave., Dana Point, CA (US) 92629

( * ) Notice: Subject to any disclaimer, the term of this patent is extended or adjusted under 35 U.S.C. 154(b) by 413 days.

(21) Appl. No.: 09/615,259

(22) Filed: Jul. 13, 2000

(51) Int. Cl.⁷ .............................................. C09K 21/00
(52) U.S. Cl. .................. 252/607; 252/601; 252/378 R; 523/179; 428/537.1; 428/921
(58) Field of Search ................. 252/601, 607, 252/378 R; 523/179; 428/537.1, 921

(56) References Cited

U.S. PATENT DOCUMENTS

| | | | | |
|---|---|---|---|---|
| 3,986,881 A | * | 10/1976 | Oberley | 106/18.15 |
| 4,373,010 A | * | 2/1983 | Oberley | 428/532 |
| 5,076,969 A | * | 12/1991 | Fox | 252/601 |
| 5,151,127 A | * | 9/1992 | Thompson | 106/15.05 |
| 5,418,282 A | * | 5/1995 | Wiehn | 524/735 |
| 5,534,305 A | * | 7/1996 | Fujiki et al. | 427/393 |
| 5,569,542 A | * | 10/1996 | Burton et al. | 428/529 |
| 6,306,317 B1 | * | 10/2001 | Richards et al. | 252/607 |
| 6,319,431 B1 | * | 11/2001 | Basson et al. | 252/607 |

FOREIGN PATENT DOCUMENTS

| JP | 52-051002 A | * | 4/1997 |
|---|---|---|---|

* cited by examiner

Primary Examiner—Margaret Medley
(74) Attorney, Agent, or Firm—Charles C. H. Wu; Wu & Cheung, LLP

(57) ABSTRACT

Wood preservative compositions are disclosed. Treatment of lumber, plywood, and other wood products with a novel composition comprising the boron source composition, a melamine binder resin, and a urea casein activator resin protects lumber, plywood, and other wood products from attack by termites, fungi, fire and flame. The preservative can be formed by combining a source of boron such as boric acid and the water-soluble salts thereof, a melamine binder resin, and a urea casein resin. A wood preservative is characterized by a weight ratio of the urea casing activator resin to the melamine binder resin ranging from about 1:20 to 1:4 and a weight ratio of the boron source composition to the melamine binder resin ranging from about 1.3:1 to 9.6:1.

31 Claims, No Drawings

FIRE RETARDANT COMPOSITIONS AND METHODS FOR PRESERVING WOOD PRODUCTS

FIELD OF THE INVENTION

The present invention relates generally to the field of treating wood products using fire-retardant, insecticidal, and fungicidal compositions and methods.

BACKGROUND OF THE ART

There are a number of properties in natural wood that make it the product of choice for building construction. Its strength, appearance, durability, accessibility and non-corrosive nature make it ideally suited for building supports, framework, decks and trims. However, wood is highly flammable and susceptible to living organisms. It is known that various compounds can be used to treat cellulosic products in order to impart a wood preservative, and flame resistant qualities thereto. The use of wood treated with such compounds came into common usage during World War II, when it was used for the construction of blimp hangars.

Due to the combustible nature of wood, building codes in virtually all U.S. municipalities restrict the use of untreated wood to certain applications. However, the preservative and/or fire-retardant treatment of wood has broadened the useful scope of both wood and wood substrates, because many of these municipalities will allow the use of treated wood as a non-combustible material in applications where untreated wood would not be permitted. Most municipalities in the United States rely on the specifications delineated within the Uniform Building Code ("UBC") and Uniform Building Code Standards to certify treated wood as suitable for all types of construction. These municipalities also rely on outside certification agencies, such as Underwater Laboratories, Inc. ("UL") to certify which preservative and/or fire-retardant treated materials meet the criteria for strength, durability, fire-retardance and other properties.

There exists in the art a uniform basis for recognition of quality control of fire-retardant treated lumber, as required by §207 of the UBC. In order to be used in structural applications, fire-retardant treated lumber must comply with UBC Chapter 8 Section 802 delineating the standards promulgated by the American Standard Testing Method (ASTM) E-84, which are equivalent to the standards of Underwriters Laboratories, Inc. (UL) Standard 723. The standards promulgated therein include UBC Standard 8-1 for Test Method for Surface-Burning Characteristics of Building Materials, UBC Standard 23-4 for hygroscopic properties, UBC Standard 23-5 for Design Values, UBC Chapter 8 Section 802 for flame spread, and the United States Military Specification No. MIL-L-19140E, Paragraph 4.6.5.2 (Amendment 1, dated Oct. 1, 1985) for corrosiveness. It is accepted that the certification standards promulgated by the International Conference of Building Officials (ICBO) provide the necessary procedures for testing treated wood products to determine whether the UBC standards are met. Fire-retardant treated lumber is qualified on the basis of testing in accordance with the applicable UBC standards, as conducted by an ICBO ES accredited laboratory. The quality control requirements include moisture content, solution concentration, chemical retention by gauge, fire tube tests, assay of borings, or other validated methods, as delineated in the Approved Quality Control Manual. These procedures are set forth in the ICBO Evaluation Service, Inc., Acceptance Criteria for Quality Control of Fire-Retardant Treated Lumber AC 66, Issued April 1997.

It is known that ammonium phosphates, aluminum sulfates, aluminum hydrates, or chlorinated paraffins can impart fire retardant qualities to treated wood. Most fire-retardant compounds make use of the same technical underpinning. These compounds comprise salt compositions which become acidic under elevated temperatures. These salts can form, for example, phosphoric and sulfuric acid and other, phosphate and sulfate derivatives under high temperatures. The acids and derivatives formed promote charring of the treated material during exposure to fire. The resulting char reduces flammability by insulating the material from the fire, thereby reducing flame spread and penetration. Many fire retardant compositions also include starches, such as molasses, in order to provide adequate charring. However, the use of such starches renders the treated materials susceptible to degradation by adventitious organisms such as insects and molds.

Plywood sheaths are often treated with fire-retardant compositions and used for roof decking. The temperature of roof decking at the interface between the overlying shingles and the roof deck can often exceed 170° F. Many prior art fire-retardant compositions begin to degrade at such temperatures, resulting in acid hydrolysis at temperatures well below those present during a fire. As a result, it has been found that many roof decks constructed from plywood sheaths treated with prior art fire-retardant compositions begin to loose structural integrity. This structural degradation occurs more rapidly in warmer climates. Furthermore, the presence of moisture has been found to accelerate the rate of thermal degradation of many treated products. Thus, in many cases, the treated plywood used as roof decking may require replacement in as little as two to seven years, because the degradation of wood products used for structural purposes results in the products being unsuitable for use.

Most known fire-retardant compositions require a drying step with high heat after application to wood materials. This high-heat step often leads to premature activation of the chemical processes designed to resist flame spread during fire, leading to acid hydrolysis of the cellulose fibers in the material treated, greatly weakening the treated product by compromising the structural integrity.

Many prior art fire-retardant compositions make use of active ingredients, such as ammonium sulfates and ammoniacal copper didecyldimethylammonium which have been found to be corrosive to metal, including common metal fasteners, such as staples or nails, which are used to secure the treated materials. Thus, for treatment of materials to be secured in place with metal fasteners, such as the majority of all materials, compositions making use of less corrosive active ingredients is critical. However, many of the replacement materials, such as ammonium phosphate are highly hygroscopic which results in high moisture pick-up by the treated product. Thus, there is a need for offsetting the hygroscopicity of the non-corrosive replacement salts.

The treatment of wood with most prior art wood fire-retardant compositions has generally required the use of incising the wood with small perforations in order to assure adequate penetration of the wood with the composition. However, in incising, the fibers of the wood are cut which leads to a reduction in the structural integrity of the treated wood.

Many prior art fire-retardant compositions discolor, as well as degrade, the material treated after prolonged exposure to the elements. For example, dark, reddish-brown charred spots soon begin to appear in wood products treated with prior art compositions. This discoloration prevents the use of the treated material where an exposed natural wood finish is aesthetically desirable.

Ammoniacal copper zinc arsenate (ACZA) and chromated copper arsenate (CCA) have been used for many years as wood preservatives. However, the prior art has demonstrated the problems presented when wood preservatives and fire retardants are combined. See White et al. "Flame Retardancy of Wood: Present Status Problems, and Future Fields." in Lewan ed. Recent Advances in Flame Retardancy of Polymeric Materials: Proceedings of 3d Annual BCC Conference on Flame Retardance (Business Communications Co., Stamford, Conn. (1992)). These problems include leaching of the preservative and/or fire retardant, from the wood and the staining or discoloring of wood when leach-preventing materials are added. Id.

Inorganic boron containing compounds impart fungicidal, insecticidal, and fire retardant properties to wood products. Since inorganic boron compounds are readily soluble in water, exposure to atmospheric moisture can cause leaching of the boron compounds. U.S. Pat. No. 5,612,094 ("Shubert") disclosed that aqueous compositions of boron compounds in and with zinc zirconium salts in which the $ZrO_2:B_2O_3$ weight ratio ranged from 0.75:1 to about 10:1, provided wood preservative qualities to treated wood, including protection against fire, fungi, and termites. Shubert disclosed that the zirconium borate compositions were resistant to leaching.

Organic compounds are sometimes added to fire-retardant compositions to seal Out moisture and contain the active salt ingredient within the structure of the treated material, thereby also raising the threshold temperature at which activation occurs. For example. U.S. Pat. No. 4,461.720 ("Loyvet") and U.K. Patent Application GB 2,200,363 both disclosed fire retardant compositions containing partially reacted solutions of dicyandiamide, melamine, formaldehyde, and an oxyacid of phosphorus. The Loyvet composition is a guanyl urea based solution in which the guanyl urea to melamine ratio is within the range of 5:1 to 10:1, and the formaldehyde to guanyl urea melamine mixture is within the range 1:1 to 2:1. These references disclosed that these fire retardant solutions provided improved leach resistance over simple urea solutions.

U.S. Pat. No. 5,389,309 ("Lopez") disclosed a urea-nitro based fire retardant solution, which included a conventional fire-retardant, such as ammonium phosphate, aluminum sulfate. aluminum hydrate. chlorinated paraffins, borax or boric acid; dicyandiamide; urea nitro; a urea/formaldehyde resin polymer in water; and a melamine and acid salt catalyst activator used to catalyze the formation of a urea/formaldehyde resin. Lopez disclosed a fire retardant solution which was non corrosive and did not require elevated temperatures to dry.

In addition to the above-described problems in the art with conventional fire-retardant compounds and with the use of untreated lumber in construction, additional problems of pest infestation and control has emerged in recent years. A dramatic example of the problem is seen in the influx of Formosan termites which are found in at least California, Hawaii, Florida, and Louisiana. The pests cause major structural damage to wood structures which can significantly compromise the stability of the wood structures. The problem is exacerbated in situations such as fires and earthquakes. Surprisingly, Formosan termites and other varieties of termites were discovered to be a significant factor in the damage caused during the Northridge, Calif. earthquake in 1994. Termites are but one adventitious organism which is deleterious to the strength of wood.

SUMMARY OF THE INVENTION

The present invention provides a method for treating flammable wood, wood products or cellulosic materials. such as those used in the construction industry, with a novel preservative composition for imparting fire retardant, insecticidal, and fungicidal properties to the treated wood products. The present invention uses an aqueous preservative composition that increases the structural strength of the treated wood products, is not corrosive to ordinary metal fasteners such as nails, screws, etc., will not leach from the treated wood products, provides moisture resistant properties to the treated wood products, does not require elevated temperatures to dry, does not attract adventitious organisms, and will not activate, hydrolyze, release nitrogen gas, or acidify at temperatures lower than those expected during a fire. The preservative composition of the present invention is also easy to handle because it is a stable aqueous solution, allowing it to be stored and shipped as a solution.

Thus, in a first aspect, the invention features a method for treating wood products to impart fire, insect, and fungus resistance qualities. The method includes the steps of applying the stable aqueous preservative composition to a wood product. The wood product can be any cellulosic-containing material, such as wood, lumber, wood substrates, paper, plywood, wood particle board, loose fill or panels, oriented strand board, mineral fiber board, modified density overlay, or cellulosic insulation, including loose fill or panel type applications, etc. The preservative composition penetrates the wood product without first incising, thereby maintaining the structural integrity of the treated wood product. The method then involves drying the treated wood product until the hydroscopic moisture content is at or below about 19%. The drying step can be completed using ambient air, without using high heat.

In a distinct embodiment. the method includes treating a wood product under pressure by applying the aqueous preservative composition for a sufficient time to diffuse the preservative composition evenly throughout the treated wood product while maintaining, a pressure which exceeds atmospheric pressure, but is less than about 200 psig for the duration of the treatment process. In a preferred embodiment, the pressure is maintained between 75 and 125 psig. In another distinct embodiment the wood product is first exposed to a vacuum, prior to application of the preservative composition, in order to reduce the moisture content, and then treated under pressure. The vacuum can range from 5" Hg. to 25" Hg. After a vacuum is applied, the treating pressure and/or treatment time can then be reduced accordingly.

The invention features a stable, non-corrosive preservative composition for imparting fire, insect, and fungus resistance qualities to wood products comprising an aqueous solution of a boron-source composition selected from the group consisting of boric acid and the water-soluble salts thereof, a melamine binder resin, and an urea casein activator resin. The amount of the boron source composition melamine binder resin, and urea casein activator resin are adjusted so that the resultant preservative composition has a weight ration of boron source to melamine ranging from 1.30:1 to 9.6:1, preferably about 8:1, and a weight ration of urea casein activator resin to melamine binder resin ranging from 1:20 to 1:4, preferably about 5.5:1.

The boron-source composition can be boric acid or the water-soluble salts of boric acid, including sodium tetraborate decahydrate, sodium tetraborate pentahydrate, sodium octaborate tetrahydrate, sodium metaborates, sodium perborate hydrates, potassium tetraborate, sodium pentaborate, ammonium pentaborate hydrate, and hydrasodium tetraborate, potassium metaborate, any alkali metal borate salt, or combinations of these compounds. Preferably, the boron source composition is disodium octaborate tetrahydrate, which is commercially available from IMC Chemical, Overland Park, K.S. or U.S. Borax, Inc., Valencia, Calif. The boron-source compound is a primary fire retardant, as well as an insecticidal and fungicidal agent.

The melamine binder resin can be any amino resin made from melamine (2,4,6-triamino symtriazine) and formaldehyde, typically used for marine graded plywood, or as a nitrogen source in binders used to make pipe insulation. The melamine binder resin is characterized by a viscosity (@ 78° F.) ranging from 600–1000, a pH ranging from 8.6–9.7, a flee formaldehyde concentration less than 0.5% by weight, a specific gravity of about 1.2, and a degree of polymerization of about 2.1. The melamine-binder resin acts as a nitrogen-liberating compound, releasing nitrogen in the presence of a flame. The melamine binder resin includes modified melamine-formaldehyde resins such as GP® 482T23 Thermal Insulation Binder Resin or GP® 476T19 Melamine Insulation Resin, both commercially available from Georgia-Pacific Resins, Inc. Decatur, Ga., or MB 46–50 Liquid Melamine Adhesive commercially available from National Casein or Cytek, located in Santa Ana, Calif., and Jersey City, N.J., respectively. Preferably, the melamine binder resin is a liquid.

The urea casein activator resin can be any liquid urea formaldehyde resin typically used for marine or N graded plywood. The casein resin activator is characterized by a viscosity (4/ 78° F.) of about 550cp, solids percentage of 63%–67%, a pH of about 7.5, a specific gravity ranging from 1.20–1.38, and a formaldehyde concentration less than 1.5%. The urea casein activator resin is also nitrogen-liberating compound, which releases nitrogen in the presence of a flame. Preferably, the urea casein activator resin is #750 Urea Resin Adhesive or GP® 1967, commercially available from National Casein, Santa Ana, Calif. and Georgia Pacific Resins, Decatur, Ga., respectively.

After application to the treated wood products, the urea casein activator resin initiates a polymerization reaction involving the melamine binder resin. The resulting melamine polymer creates a substantially impervious barrier to atmospheric moisture and also binds or encapsulates the wood preservative composition to the treated wood product to prevent leaching of the boron source composition from the treated wood product through solubalization by atmospheric moisture. The melamine polymer acts as a nitrogen-liberating compound, Which releases nitrogen in the presence of a flame.

In still another aspect of the present invention, the wood preservative composition is formulated in combination with a conventional glue substrate or pigment. In a preferred embodiment, this fire-retardant glue is used to bind the laminate structure of plywood and similar laminar wood structures.

In a related aspect, the invention features a treated wood product containing an insecticidal, fungicidal, and fire retardant amount of a melamine polymer borate preservative that is substantially impervious to moisture, so as to limit leaching of the preservative composition from the treated wood product and to further limit the penetration of water into the treated wood product. As a further aspect of the present invention, the treated wood product. is also made structurally stronger when compared to an untreated wood product after treatment with the wood preservative composition of the present invention and sufficient aging to allow for sufficient polymerization. Preferably, the treated wood product is lumber, plywood. wood particle board, oriented strand board, mineral fiber board, or modified density overlay. In a preferred embodiment, the treated wood product contains at least 0.1 7 lb/ft$^3$ of $B_2O_3$ if the treated wood is to be used in above ground applications, or 0.28 lb/ft$^3$ of $B_2O_3$, if the treated wood is to be used in ground contact applications. The treated wood products are resistant to Fomosan termites.

In a further related aspect, the invention features a process of preparing a preservative composition used for treating wood products, comprising mixing a primary fire-retardant agent containing a source of boron, selected from the group of boric acid and the water-soluble salts thereof, a polymer binder resin, and a polymer activator resin; and mixing until a smooth composition is obtained. Preferably continuous mixing of the preservative composition is provided throughout the process.

The present invention provides superior fire retardant pest control and/or fungus control compositions and treatments, including the use of superior resins and material processing procedures, heretofore never applied. Further objects, features and other advantages of the present invention will become apparent from the ensuing detailed description and from the claims.

DETAILED DESCRIPTION OF THE PREFERRED EMBODIMENTS

The preservative compositions of this invention are prepared by mixing one or more of the boron source compositions, the melamine binder resin, and the urea casein activator resin in an aqueous solution. Thus, the boron source compositions can first be dissolved in water and then can be mixed with the melamine binder resin and the urea casein activator resin, in that order. The melamine binder resin and urea casein activator resin can be each individually mixed in water before addition to the other ingredients of the preservative composition. This allows the proper buffering effect to occur. Generally, the urea casein activator resin is added last. The preservative composition can also be formed by first combining the melamine binder resin and the urea casein activator resin with water to form an aqueous solution. The aqueous solution of the melamine binder urea casein resin activator can then be added to an aqueous solution of the boron-source composition. Alternatively, the preservative composition can be formed in a step process within the wood products themselves by first applying the boron-source composition and then applying an aqueous solution comprising the melamine binder resin and the urea casein activator resin.

The boron-source composition is a primary fire retardant, as well as an insecticidal and fungicidal agent. The boron-source composition can be boric acid or the water-soluble salts of boric acid. Generally, however, the preservatives may be any hydrate of an alkali metal salt or boric acid. Such salts may include sodium, potassium, lithium, and the like. Compositions having mono-, di-, tri, or other plural salt moieties are contemplated. Similarly, varying degrees of hydration are also contemplated.

Specific compositions include sodium tetraborate decahydrate, sodium tetraborate pentahydrate, sodium octaborate tetrahydrate, sodium metaborates, sodium perborate hydrates, potassium tetraborate, sodium pentaborate, ammonium pentaborate hydrate, and hydrasodium tetraborate, potassium metaborate, any alkali metal borate salt, or combinations of these compounds. Various mixtures of the boron source compositions can also serve as the primary fire retardant. Most preferably, the boron source compound is disodium octaborate tetrahydrate $Na_2B_8O_{13}$, $4H_2O$, which is commercially available from sources such as IMC Chemical, Overland Park, K.S. or U.S. Borax, Inc., Valencia, Calif. It is toxic to fungus and wood-destroying insects, including termites. Disodium octaborate tetrahydrate forms finer crystals which more readily penetrate the pores of the porous cellulosic materials to which the compositions are applied. This material also has a high heat activation. In other words, high temperatures are required to convert the disodium octaborate tetrahydrate into the acidic forms resulting in the fire-retardant effect.

Typically, disodium octaborate tetrahydrate contains about 14.2–15% $Na_2O$, 67.3–67.5% $B_2O_3$ and 17.5–17.6% water of crystallization. The boron-source composition is included in the composition in a range of from about 5% to about 25% by weight of the total aqueous solution. or more preferably from about 10% to about 20%.

The melamine binder resin is a modified melamine binder resin, such as those melamine resins which are primarily used for marine graded and N graded plywood, or as a nitrogen source in binders to make pipe insulation. The melamine binder resin can be any amino resin made from melamine (2,4,6-triamino symtriazine) and formaldehyde, characterized by a viscosity (@ 78° F.) ranging from 600–1000, a pH ranging from 8.6–9.7 a free formaldehyde concentration less than 0.5%, by weight, a specific gravity of about 1.2 to 1.24, and a degree of polymerization of about 2.1. The melamine-binder resin includes modified melamine-formaldehyde resins such as GP® 482T23 Thermal Insulation Binder Resin or GPO® 476T19 Melamine Insulation Resin, commercially available from Georgia-Pacific Resins, Inc, Dekatur, Ga., or MB 46–50 Liquid Melamine Adhesive, commercially available from National Casein or Cytek, Santa Ana, Calif. and Jersey City, N.J. respectively. Preferably, the polymer binder resin is a liquid. The melamine binder resin is a nitrogen-liberating compound, which releases nitrogen in the presence of a flame.

The melamine binder resin is included in the composition in a range from about 1% to about 13% by weight of the total aqueous solution. The ratio of the boron-source composition to the melamine binder resin ranges from about 1.3:1 to 9.6:1, preferably about 8:1. Similarly the BO to melamine weight ration ranges from about 0.9:1 to 6.5:1 preferably about 5.4:1.

The use of a melamine binder resin provides a composition of superior characteristics. The melamine binder resin provides a casing for the fire retardant. Thus, the treated materials are protected from water damage and from other elements, thereby preventing the primary fire retardant from leaching from the treated wood product. The protection of the material from water offsets the hygroscopic properties of many primary fire-retardants, such as ammonium phosphates. In addition, the use of melamine binder resins actually enhances the strength of the treated wood relative to other treated wood products or untreated wood products. Unlike many prior art fire retardant compositions, the composition of the present invention does not significantly corrode metals. Additionally, the preservative composition is absorbed easily by wood and provides structural rigidity thereto.

Although melamine resins are widely used in the wood products industry as molding compounds, fillers, adhesives and for laminating, a major drawback is its limited stability. Accordingly, storage of melamine is difficult, and liquid solutions containing melamine typically have a very short working period before they will set. Thus, melamine solutions must be replaced frequently, resulting in both increased handling and material costs.

In accordance with the invention, it has been unexpectedly discovered that the preservative composition can be improved and stability enhanced through the utilization of liquid suspensions of melamine-binder resin. The liquid suspensions of melamine-binder resin are prepared by dissolving a melamine-binder resin in water, and then buffering with phosphates at a slightly acidic pH of approximately 6.0 to about 6.5. The total nitrogen content of the buffered malamine-binder resin solution is in the range of about 17.2% to about 18.3% by weight (including water) and the total phosphate concentration is in the range of about 15.7% to about 16.8% by weight (including water). The resulting aqueous solution has a specific gravity of about 1.28 g/ml and a refractive index of 1.457. Through use of the suspensions, it is possible to blend fire-retardant compositions with improved consistency, improved specific gravity and improved stability. As such, wood treated with preservatives containing liquid suspensions of melamine-binder resin exhibits improved fire-retardant qualities.

In order to polymerize the melamine binder resin, an activator is generally required. A urea casein activator resin provides excellent results in this regard. The urea casein activator resin can be any liquid urea resin adhesive with a viscosity of about 550 cp (@ 78° F.), solids percentage of 63% –67%, a pH of about 7.5, a specific gravity ranging from 1.20–1.38, and a formaldehyde concentration less than 1.5%. The urea casein activator resin includes #750 Urea Resin Adhesive or GP® 1967 Casein, commercially available from National Casein, Santa Ana, Calif. and Georgia Pacific Resins, Decatur, Ga., respectively. The urea casein activator resin is a nitrogen-liberating compound, which releases nitrogen in the presence of a flame. Preferably, the urea casein activator resin is a liquid.

The urea casein activator resin ranges in an amount of from about 0.16 to 3.5% by weight (including water) of the aqueous wood preservative composition. Higher amounts of the urea casein activator resin will cause the melamine binder resin to polymerize very quickly and at lower temperatures, while lower amounts will require longer curing times and higher temperatures. Thus preferably, the urea casein activator resin is added within the weight ratio range of 1:4 to 1:20 in relation to the melamine binder resin in order to allow for adequate shelf life of the aqueous preservative composition while still allowing for practicable polymerization times and conditions.

The urea casein activator resin is suspended separately in water, prior to being mixed with the other components of the composition in order to assure complete mixing. Typically, a 1:1 volumetric aqueous solution is prepared.

In addition, a concentrate solution comprising an aqueous solution of the melamine binder resin and the urea casein activator resin can be prepared. This concentrate solution is characterized by a specific gravity ranging from 1.14 through 1.20, a percent solids ranging from 30% to 82%, a pH ranging from 7.0 through 9.5, and a refractive index ranging from 1.39 through 1.47. As stated above, the concentrate solution has a melamine binder resin to urea casein activator resin weight ratio ranging from 1:4 to 1:20.

The melamine binder resin and the urea casein activator resin are nitrogen containing compounds which liberate gaseous nitrogen during burning (sometimes referred to herein as "nitrogen liberating compounds"), resulting in foaming of the carbonized layer on the other surface of the treated material. This foaming increases the thickness of the carbonized layer, resulting in increased insulation of the unburned material below. At the same time the liberated nitrogen serves to dilute oxygen in the vicinity of the material to retard combustion.

In formulating the preservative composition of the present invention, the specific gravity ranges from 1.030–1.075. The preservative composition of the present invention is characterized by a Hydrometer table (attached as Appendix A) relating the specific gravity, ambient temperature, and percent solids of the preservative composition. At 25° C., the preservative composition, pursuant to the Hydrometer Table, the percent solids ranges from 3.3% (40° F., S.G.=1.03) to 20.67% (119° F., S.G.=1.075).

In a highly preferred embodiment, the fire-preservative composition is prepared according to the following weight percentages (excluding water):

| | |
|---|---|
| Disodium Octaborate Tetrahydrate: | 87% |
| Modified Melamine-Binder Resin: | 11% |
| Urea Casein Activator Resin: | 2% |

This ratio achieves the appropriate pH in the resulting composition.

The wood preservative and fire-retardant compositions prepared utilizing liquid solutions of melamine binder resin and urea casein activator resin, and containing the above formulation, possess very smooth, clear consistencies and are rapidly and deeply absorbed into wood, indicating deeper and more effective wood preservative penetration. Conventional additives can also be added to the preservative composition, such as coloring agents, odor modifying agents, thickeners, or glue, depending upon the wood treatment application.

As will be appreciated by those in the art, other melamine binder resin and urea casein activator resin systems could be used in accordance with the invention. The basic consideration applicable to resin activator systems is that they (i) do not materially detract from the strength of the treated wood and preferably enhance the structural integrity of the treated wood, (ii) provide a sealing function to limit leaching and limit water absorption, and (iii) add to the fire-retardant qualities of treated wood, (iv) and can be combined to provide a stable solution which can be stored and reused without any depreciable effect on the wood preservative qualities of the preservative composition.

As will be appreciated by those of ordinary skill in the art, other wood preservatives, fire retardants, insecticidal agents, or fungicidal agents can also be admixed with the preservative composition in accordance with the invention to obtain a similar preservative effect.

The wood preservative compositions can be applied to any flammable material to decrease flammability. For example, the compositions can be applied to porous materials, including cellulosic products such as paper, wood, lumber, plywood, wood particle board oriented strand board, mineral fiber board, modified density overlay, wood substrates, cellulose insulation including loose fiber or panel-type. The compositions can be applied in any conventional manner which are well known in the wood preserving and fire retardant arts, including soaking, spraying, brushing, rolling, pressure treating, surface application, by adding the composition during manufacture and the like. The preservative compositions can be applied to existing wood or structural members during retrofit or renovation projects in which the wood must be treated in place. In practicing the method of this invention, the wood product is treated with the preservative composition in a manner so as to impregnate the wood product and deposit and distribute a fire retardant, insecticidal, and fungicidal amount of the wood preservative to the wood product being treated.

Because the composition is stable as a liquid, any remaining or excess composition from a treatment process can be recovered and reused, resulting in substantial material cost savings. Advantageously, wood treated with the composition of the present invention requires no incising to permit adequate penetration, resulting in a substantial reduction in handling costs for wood treated with the present preservative composition.

Materials that are not readily penetrated, such as wood, are preferably treated by exposure to the preservative composition at an elevated pressure in a pressure vessel or other equivalent equipment, such as is known to one of skill in the art. The pressure must exceed atmospheric pressure but is less than about 200 psig for the duration of the treatment process. Preferably. the pressure is maintained between 75 and 125 psig. In addition, the wood product can first be exposed to a vacuum ranging from 5 inches to 25 inches (Hg) in order to reduce the moisture content prior to pressure treating with the wood preservative composition.

Preferably, the separate pieces of material to be treated are separated prior to treatment to allow even access to the composition. This separation can be accomplished by a process known as "sticking," which comprises placing small sticks between the pieces of material, to provide separation.

In order to recover excess preservative composition after the wood products have been treated, the materials can optionally be brought to a recovery area where excess composition is allowed to drip off the materials and is collected for reuse.

The materials can be dried by exposure to climatic air flow. Drying will occur more rapidly under warmer, drier conditions. The drying area can be outdoors in a warm, dry climate, or indoors when required by outside weather conditions. Preferably, in order to promote drying, the treated materials are separated to allow the to air flow around. As an advantage, if the materials are "sticked" prior to the treatment process, they can be left in this sticked configuration in order to maintain separation during the drying process.

For wood, the drying proceeds until the hygroscopic moisture content is at a maximum of 19% or below. Wood treated by pressure treatment will be impregnated with the preservative composition to provide superior fire-retardance and structural rigidity. After treatment with the preservative composition, the resultant wood products exhibit fire retardant, insecticidal, and fungicidal properties. In operation, following the drying of the treated wood product. The resulting polymer formed by the curing of the melamine binder resin binds or encapsulates the preservative within the structure of the wood products, which deters or prevents leaching of the preservative. The resultant treated wood products containing the melamine polymer borate preservative are thus extremely useful in any type of rigorous service where exposure to atmospheric moisture is either frequent or extreme, such as outdoor decking, patio roofs, exterior siding, etc. Moreover, planing of such treated wood up to about as much as $1/16$ inch will not remove all the preservative composition, and thus will not remove the fire-retardant characteristics of the treated wood. Additionally, the deeper planing of one side of a four-sided treated board will leave substantial fire-retardant qualities in the board.

In addition, the preservative composition of the present invention can be applied in a single charge. As a result, in a single treating process a wood product can be prepared that has superior fire retarding properties as well as providing superior pest and fungus resistance without reducing fire-retardant effect. Further, wood products treated with the preservative composition are not materially affected in their strength relative to wood not containing the preservative compositions.

The composition of the present invention provides a number of properties that differ greatly and substantially in kind and scope from prior art fire-retardant and preservative compositions, providing several significant advantages. For example, the composition is substantially non-corrosive to metal and has no starches to degrade wood fiber or attract adventitious organisms. The preservative composition does not require high heat for drying, such as that produced through the use of a kiln, thereby eliminating any premature activation of the fire-retardant during the drying step. Moreover, the composition has a high heat of activation, thereby substantially eliminating the degradation of treated materials by exposure to temperatures below those found in a fire, such as those found in roof decks or rafters. Additionally, the substantial elimination of premature activation inhibits the formation of discoloration which prevents the use of the treated materials where an exposed natural finish is aesthetically desirable.

As stated above, the composition also provides structural rigidity to the material to which it is applied. Thus, should the treated material begin to decay from any of a variety of causes, structural rigidity is retained. Also, the composition is stable for long periods of times, which allows the composition to be prepared and stored for shipment and also allows for reuse of recovered preservative composition after the treatment process.

Preferably, the treated wood products contain 0.17 pounds per cubic foot $B_2O_3$, if the treated wood is to be used in above-ground applications, and 0.28 pounds per cubic foot $B_2O_3$ if the treated wood is to be used in ground contact applications.

Wood products treated with the preservative composition of the present invention meet or exceed ICBO ES standard AC66, Acceptance Criteria for Quality Control Fire Retardant-Treated Lumber, April 1997, including the following tests:

1. U.L. 723, ASTM E-84, NFPA 255-Test for Surface Burning Characteristics of Building Materials;
2. ASTM D-3201-Fire Retardant Wood Test for Hydroscopic Properties;
3. ASTM D-143-83-Determination of Potential Strength Reduction; Characteristics Due to Effects of Elevated Temperature and Moisture
4. ASTM D-55 16-94-Standard Test for Evaluating The Flexural Properties of Fire Retardant Treated Soft Wood Plywood Exposed to Elevated Temperatures;
5. Military Specifications MIL-L-19140E, paragraph 4.6.5.2-Corrosiveness Test, Lumber and Plywood Fire Retardant Treated;
6. Military Specifications MIL-L-19140E, paragraph 3.4-Strength Retention, Lumber and Plywood Fire Retardant Treated.

Wood products treated with the composition of the present invention also conforms to the mandated Uniform Building Code requirements and the Uniform Building Code Standards for pest control and fire retardant treated wood for structural applications in buildings or structures, including the standard for flame spread, hydroscopic properties, strength, and corrosiveness.

The following examples are provided to demonstrate a preferred method of preparing and using the wood preservative compositions of the present invention. As such, they are intended to illustrate, and not to limit the invention in any way.

EXAMPLE 1

A. To a mixing tank, add 1000 gallons of water.
B. Add 800 pounds of Disodium Octaborate Tetrahydrate (available from IMC Chemicals Inc. of Overland Park, Kans.).
C. Commence mixing, and continue mixing throughout.
D. Add 106.6 pounds (10 gallons) of liquid Melamine-Binder Resin (available from Cytec, Jersey City, N.J., National Casein, Santa Ana, Calif.; or Georgia Pacific, Decatur, Ga.)
E. In a separate mixing tank; combine 21.60 pounds (2 gallons) of urea casein activator resin (available from Georgia-Pacific Resins, Inc. Decatur, Ga.) with 2 gallons of water, to obtain a 1:1 volumetric ratio. Mix thoroughly.
F. Add contents of urea casein activator resin to (1000 gallon) mixing tank
G. Continue mixing until a smooth clear texture blend is obtained.
H. Transfer to-chemical holding tank, and store until ready for use.

Using the Hydrometer Table, the composition of Example 1 has a specific gravity of 1.05 and a % solids of 0.1026 at 72° F. The composition of Example 1 is ready for immediate application to the material to be treated. The composition can also be stored in a sealed container for an indefinite period of time without setting or losing its wood preservative qualities.

EXAMPLE 2

A. To a small mixing tank add 4 gallons of water.
B. Add 1 gallon of liquid Melamine Binder Resin (available from Cytec, Jersey City, N.J.; National Casein, Santa Ana, Calif.; or Georgia Pacific, Decatur, Ga.).
C. Add 2 gallons of urea casein activator resin (available from Georgia-Pacific Resins, Inc., Decatur, Ga.).
D. Mix thoroughly.
E. Transfer to chemical holding tank, and store until ready for use.

The concentrate composition of Example 2 has a specific gravity ranging from 1.14 through 1.120, a % solids ranging from 30 to 82 percent, a pH ranging from 7.0 to 9½, a fricative index of 1.39 through 1.47. The composition of Example 2 can be added to an aqueous solution of disodium octaborate tetrahydrate in order to prepare the final preservative composition. The concentrate composition can be stored in a sealed container for an indefinite period of time without setting.

EXAMPLE 3

A preservative composition was prepared in accordance with the procedure set forth in Example 1 and applied to Coast Douglas Fir boards. This wood type is generally specified for use as structural support in all types of buildings.

A. Coast Douglas Fir Boards (2" by 6") were visually inspected for mill-grade, size, moisture content, and quality. The measured moisture content was under 19%.

B. The unincised boards were then stacked with sticking to separate the boards within the stack.

C. Each lift (stack) of boards was placed on steel horizontal rolling lumber racks.

D. Each lift of boards was rolled into a Horizontal Pressure Vessel.

E. The vessel door was firmly and properly sealed, a vacuum of approximately 22" was pulled and the composition of Example 1 was pumped into the vessel (without admission of air) until the treatment vessel was full of treating solution. A pressure of approximately 100 psig was then applied.

F. The volume of preservative composition which the Coast Douglas fir Boards needed to absorb in order to meet U. L. requirements was calculated using the Hydrometer Table.

G. Treatment in the vessel proceeded for several minutes until the necessary volume of preservative solution had been pressed into the Coast Douglas Fir Boards.

H. Each stack of wood was then rolled out of the vessel and transferred to a horizontal receptacle recovery tank to recapture any excess preservative composition.

I. The stacks were then transferred to the drying area where they were allowed to dry exposed to the atmosphere at ambient temperature (varied from 55° F. to 90° F.) for a period of days, until measured moisture content was below 19%. The boards were then prepared for shipment.

EXAMPLE 4

Uninicised preservative nominal ½ inch, 5 ply Douglas fir plywood was treated in accordance with the procedure set forth in Example 3. The plywood was treated under the observation of a representative of Underwriters Laboratories Inc. The treated plywood was tested in accordance with UL Standard 723 (Eighth Edition) "Test for Surface Burning Characteristics of Building Materials." This test determines the surface burning characteristics of the test material, specifically Flame Spread Index and Smoke Developed Index when treated wood is exposed to fire:

Each test consisted of three 8 ft. panels, 24 in. wide The panels were laid across the tunnel width with their edges resting on the tunnel ledges with their ends butt-jointed to form a continuous 24 foot test surface. To complete the 25 foot tunnel length, a 14 by 24 in., 16 gauge steel plate was spaced upstream of the burners. Since the test specimens had sufficient rigidity to support themselves, no additional support was required. The Douglas fir treated plywood was evaluated for flame spread and evidence of significant progressive combustion for 30 minutes under the same conditions of exposure. The maximum distance along a sample length to which the flame spreads from the end of the igniting flame was determined by observation. The flame spread index is derived by plotting the progression of the flame front on a time distance basis with no allowances made for flame front recession. The flame spread index is calculated according to the following:

A. Flame spread index=$0.515 A_t$ when $A_t$ is $\leq 97.5$ min-ft.

B. Flame spread index=$4900 \div 195 - A_t$ when $A_t$ is $>97.5$ min-ft. Where $A_t$=the total area under the time distance curve expressed in min-ft.

The results of the Flame Spread Index test are given in Table 1. During the 30 minute test, the flame spread did not progress more than ten and one-half feet (10½ feet) behind the center line of the burners, and there was no evidence of significant progressive combustion.

TABLE 1

| Material | Max. Flame Spread Ft. | Time of Maximum Flame Spread. Min:Sec. | Calculated Total Area Under the Time Distance Curve, Min - Ft. | Calculated Value For Flame Spread |
| --- | --- | --- | --- | --- |
| Treated Douglas Fir Plywood | 1 | 6:12 | 5.3 | 2.7 |
| Treated Douglas Fir Plywood | 1 | 6:10 | 6.7 | 3.4 |
| Treated Douglas Fir Plywood | 1 | 3:51 | 7.0 | 3.6 |

The smoke developed during the test was monitored by a photoelectric circuit operating across the furnace flue. A curve was developed by plotting values of light obscuration as measured in decreased cell output versus time. The Smoke Developed Index was obtained by expressing the area under the curve developed for the sample material as a percentage of the area under the curve developed for untreated red oak.

The smoke developed index is expressed as:

smoke developed index=$Am \div Aro \times 100$ where: Am=the area under the curve for the test material
Aro=the area under the curve for untreated red oak.

The Results of the Smoke Developed Index are given in Table 2.

TABLE 2

| Material | Calculated Value for Smoke Developed |
| --- | --- |
| Treated Douglas Fir Plywood | 12.3 |
| Treated Douglas Fir Plywood | 20.7 |
| Treated Douglas Fir Plywood | 19.0 |

Based on the aforementioned results. Underwriters Laboratories has classified Douglas Fir Treated Plywood treated with compositions of the present invention as having a Flame Spread rating of 5 and a Smoke Developed Index of 15 or FR-S++.

EXAMPLE 5

Uninicised, Douglas fir lumber of varying sizes, including 2"×4"×8' and 2"×6"×8' was treated with a wood preservative prepared in accordance with the procedure set forth in Example 3 and was tested in accordance with the above procedures. The Flame Spread Index and Smoke Developed Index were determined in accordance with UL Standard 723. Underwriters Laboratories has classified the Douglas Fir Lumber treated with compositions of the present invention as having a Flame Spread rating of 15 and a Smoke Developed Index of 20.

EXAMPLE 6

Uninicised, Nominal ⅞"×2'×8' Particle Board was treated with a wood preservative prepared in accordance with the procedure set forth in Example 3. The chemical retention based on Weight immediately after treatment was determined. The retention was calculated as the weight gain times the solids fraction (0.162 lbs.) divided by the volume (1.167 cu.ft.), and is set forth in Table 3.

TABLE 3

| Panel I.D. | Initial Weight Oct. 24, 1995 (lbs.) | Final Weight Nov. 1, 1995 (lbs.) | Retention (PCP) |
|---|---|---|---|
| 11A | 51.5 | 86.0 | 4.79 |
| 11B | 49.5 | 85.0 | 4.93 |
| 12A | 50.5 | 85.5 | 4.86 |
| 12B | 50.0 | 85.5 | 4.93 |
| 13A | 51.0 | 85.5 | 4.79 |
| 13B | 51.5 | 85.0 | 4.65 |
| 14A | 50.5 | 85.5 | 4.86 |
| 14B | 52.25 | 87.0 | 4.82 |
| 15A | 50.5 | 85.0 | 4.79 |
| 15B | 49.5 | 86.0 | 5.07 |
| Average | | | 4.84 |

The treated particle board W(as tested in accordance with UL Standard 723 (Eighth Edition) "Test for Surface Burning Characteristics of Building Malenaiss." The Flame Spread Index and Smoke Developed Index was determined. The results are set forth in Table 4.

TABLE 4

| Description of Material | Factor | Smoke Factor |
|---|---|---|
| Treated Wood Particle Board | 21.0 | 46.9 |
| Treated Wood Particle Board | 21.5 | 52.9 |
| Treated Wood Particle Board | 21.5 | 45.9 |

EXAMPLE 7

Unincised, Nominal 7/8"×2'×8' MDF Boards were treated with a wood preservative composition in accordance with the procedure set forth in Example 3. The Chemical retention based on Weight immediately after treatment was determined. The retention was calculated as the weight gain times the solids fraction (0.162 lbs.) divided by the volume (1.167 cu.ft.), and is set forth in Table 5.

TABLE 5

| Panel I.D. | Initial Weight Oct. 24, 1995 (lbs.) | Final Weight Nov. 1, 1995 (lbs.) | Retention (PCP) |
|---|---|---|---|
| 6A | 48.0 | 80.0 | 4.44 |
| 6B | 48.5 | 76.0 | 3.82 |
| 7A | 48.5 | 87.0 | 5.34 |
| 7B | 49.5 | 85.0 | 4.93 |
| 8A | 46.0 | 85.0 | 5.41 |
| 8B | 45.0 | 84.0 | 5.41 |
| 9A | 45.5 | 84.0 | 5.34 |
| 9B | 46.5 | 85.0 | 5.34 |
| 10A | 46.5 | 82.0 | 4.93 |
| 10B | 45.5 | 85.0 | 5.48 |
| Average | | | 5.04 |

The treated MDF boards were tested in accordance with UL Standard 723 (Eighth Edition) "Test for Surface Burning Characteristics of Building Materials." The Flame Spread Index and Smoke Developed Index were determined. The results are set forth in Table 6.

TABLE 6

| Description of Material | Factor | Smoke Factor |
|---|---|---|
| Treated MDF Board | 25.5 | 89.0 |
| Treated MDF Board | 28.8 | 103.5 |
| Treated MDF Board | 29.2 | 115.4 |

EXAMPLE 8

Uninicised Coast Douglas Fir 2"×4" structural lumber boards were treated in accordance with the procedure set forth in Example 3. The unaged, treated lumber boards were then tested for strength retention pursuant to MIL-L-19140E, "Military Specification, Lumber and Plywood, Fire-Retardant Treated." These tests consisted of static bending, tensile strength, compressive strength, and shear strength. ASTM D143-83 "Standard methods of Testing Small Clear Specimens of Timber" was used as the approved nationally recognized standard. Two sets of structural lumber were tested. Set A consisted of untreated unincised lumber to serve as a control. Set B consisted of unincised lumber treated with the composition of the present invention.

All wood samples were conditioned before testing at 68° F.+/−6° F. and 65%+/−5% relative humidity in an air conditioned, dehumidified laboratory testing room. Table 7 sets forth the results of these tests.

TABLE 7

| Determination | Unincised Untreated | Unincised Treated | Strength Retention | MIL-L-19140E Requirements |
|---|---|---|---|---|
| Modulus of Elasticity (psi) | 1,640,000 | 1,640,000 | 100% | 80% Minimum |
| Modulus of Rupture (psi) | 8,210 | 7,930 | 94.5% | 80% Minimum |
| Work to Maximum Load (in-lb/cu in) | 60.4 | 59.9 | 99.2% | 65% Minimum |

EXAMPLE 9

Unincised Coast Douglas Fir 2"×4" structural lumber boards were treated with a preservative composition in accordance with the procedure set forth in Example 3. Three sets of treated samples were cut in accordance with UBC 25–29. One was stored at ambient laboratory conditions of 72° F.+/−5° F. and 50%+/−5% relative humidity. The second set was exposed for 30 days at 150° F.+/−5° F. and 65%+/−5% relative humidity. The third set was exposed for 60 days at 150 ° F.+/−5° F. and 65%+/−5% relative humidity. The three sets were tested in accordance with ASTM D143-83 and UBC 25–29. The average specific gravity of the treated samples was 0.498 with a standard deviation of 0.056. Tables 8 and 9 sets forth the results of these tests.

TABLE 8

| Determination | Treated Control Set | Treated, Aged 30-Days Set | Treated, Aged 60-Days Set |
|---|---|---|---|
| Horizontal Shear Strength (Parallel to Grain) (psi) | 2,290 | 2,840 | 2,960 |

TABLE 8-continued

| Determination | Treated Control Set | Treated, Aged 30-Days Set | Treated, Aged 60-Days Set |
|---|---|---|---|
| Compressive Strength (Parallel to Grain) (psi) | 6,180 | 6,940 | 7,050 |
| Modulus of Elasticity, Flexural (psi) | 938,900 | N/D | 1,033,200 |
| Flexural Strength, Extreme Fiber in Bending (psi) | 12,320 | 13,870 | 13,650 |
| Tensile Strength (Parallel to Grain) (psi) | 13,600 | 13,400 | 14,000 |

TABLE 9

| Determination | Strength Change of Treated Wood compared to Unaged Untreated Wood L/N 28207 (%) | Strength Change of Treated Wood Aged 60 days compared to Unaged Treated Wood (%) | Net change (%) | UBC Strength Reduction Values (%) |
|---|---|---|---|---|
| Horizontal Shear Strength (Parallel to Grain) | −4.0 | +29.3 | +25.3 | 125.3 |
| Compressive Strength (Parallel to Grain) | −8.4 | +14.0 | +5.6 | 105.6 |
| Modulus of Elasticity Flexural | −0.0 | +10.0 | +10.0 | 110.0 |
| Flexural Strength Extreme Fiber in Bending | −6.2 | +10.8 | +4.6 | 104.6 |
| Tensile Strength (Parallel to Grain) | +2.4 | +2.9 | +5.3 | 105.3 |

The above data demonstrates that there was no loss in strength of test samples from treated wood which were aged 60 days at 150° F. +/−5° F. and 65% +/−5% relative humidity, compared to unaged treated wood test samples.

EXAMPLE 9

Metal strips of SAE1010 Annealed Steel, CDA23085-15 Red Brass per ASTMB36C23 000-0S050, 2024-T3 Aluminum per Federal Specification QQ-A-250-4 were prepared into 1"×2"×1/16" Corrosion test Coupon in accordance with military specification MIL-L-19140 "military specification number in plywood fire retardant treated" paragraph 4.6.5.2 and AFTNG1-88 "recommended practice for preparing cleaning and evaluating corrosion test specimens." Two coupons were prepared of each alloy and weighed to the nearest tenth of a milligram. They were sandwiched in between two original surfaces of wood, treated with a preservative composition prepared in accordance with the procedure set forth in Example 3. The treated wood was pre-conditioned for ten days at a 120° plus or minus 2° Fahrenheit and 90° plus or minus 1% relative humidity. C clamps were used to hold the sandwiches to insure complete contact. The assemblies were then exposed for an additional ten days under the same conditions. After exposure the samples were cleaned in accordance with ASTM and military procedures and re-weighed. Corrosion weight was calculated in accordance with MIL-L-19140. Table 9 gives the results of this test.

TABLE 9

| Sample I.D. | Corrosion Rate (mil/yr) | MIL-19140E Ammd. 1 Requirements (mil/yr) |
|---|---|---|
| 1010 Steel | 4.22 | 25 maximum |
| 230 Red Brass | 3.92 | 25 maximum |
| 2024-T3 Aluminum | 3.07 | 25 maximum |

EXAMPLE 11

Unincised 7/8"×4'×8' wood particle board was treated with a preservative composition in accordance with the procedure set forth in Example 3. The treated wood particle board specimens were then tested in accordance with ASTMD3043 method "A" and ASTM D1761 specifications. The results of these tests are given in Table 10.

TABLE 10

| Test | Observations |
|---|---|
| Modulus of Elasticity | 400,000 psi |
| Modulus of Rupture | 2,152 psi |
| Average Density | 46 lb/ft$^3$ |
| Screw Holding Capacity | |
| a) Face | 265 lbs. |
| b) Edge | 235 lbs. |

What is claimed is:

1. A preservative composition for imparting fire retardant, insecticidal, and fungicidal properties to wood products, consisting essentially of an aqueous solution of a boron source composition selected from the group of boric acid and the water-soluble salts thereof, a melamine binder resin, and a urea casein activator resin.

2. The preservative composition of claim 1, wherein the weight ratio of the urea casein activator resin to the melamine binder resin ranges from about 1:20 to 1:4, and the weight ratio of the boron source composition to the melamine binder resin ranges from about 1.3:1 to 9.6:1.

3. The preservative composition of claim 1, wherein the boron source composition is in an amount of at least about 55% to about 90%, the melamine binder resin is in an amount of at least 9% to about 36%, and the urea casein activator resin is in an amount of at least 0.50% to about 9%, by dry weight.

4. The preservative composition of claim 1, wherein the combined weight of said melamine binder resin and said boron source composition comprises at least about 91% to about 99.5% by dry weight.

5. The preservative composition of claim 2 which is stable and storable in the form of a liquid.

6. The preservative composition of claim 5, wherein said boron source composition is an alkali metal borate salt.

7. The preservative composition of claim 6, wherein said alkali metal borate salt is disodium octaborate tetrahydrate.

8. The preservative composition of claim 7, wherein the weight ratio of the disodium octaborate tetrahydrate to the melamine binder resin is about 8:1, and the weight ratio of the melamine binder resin to the casein activator resin is about 5.5:1.

9. The preservative composition of claim 2, further comprising a mixture of at least two distinct boron source compositions selected from the group of boric acid and the water soluble salts thereof.

10. A stable, aqueous preservative composition for treating a wood product which is capable of penetrating said wood products without incision and does not reduce the structural integrity of said wood products, consisting essentially of a primary fire retardant composition capable of imparting an insecticidal, fungicidal, and flame retardant qualities to the wood product; consisting essentially of an aqueous solution of a boron source composition selected from the group of boron acid and the water-soluble salts thereof;

a melamine binder resin; and a urea casein activator resin;

wherein the melamine binder resin and the urea casein activator resin react to form a nitrogen liberating compound which releases nitrogen gas when exposed to a flame and acts as a binding agent to inhibit the primary fire retardant composition from leaching from the wood products.

11. The preservative composition of claim 10, wherein said primary fire retardant composition is disodium octaborate tetrahydrate.

12. A method for preserving a wood product against fungus, insects and fire, comprising the steps of treating the wood product with a fungicidal, insecticidal, and fire retardant amount of a stable, aqueous preservative composition, wherein the aqueous preservative composition consisting essentially of a boron source composition selected from the group of boric acid and the water-soluble salts thereof, a melamine binder resin, and an urea casein activator resin; and drying the treated wood product until the hygroscopic moisture content is at or below about 19%.

13. The method of claim 12, further consisting essentially of the step of treating the wood product with the stable aqueous preservative composition under pressure.

14. The method of claim 13, wherein the pressure ranges from 75–125 psig.

15. The method of claim 13, further consisting essentially of the step of applying a vacuum to the wood products prior to the pressure treating step.

16. The method of claim 15, wherein the vacuum ranges from 5" Hg to 25" Hg.

17. The method of claim 15, wherein the boron source composition is disodium octaborate tetrahydrate.

18. The method of claim 12, wherein the treated wood product is dried at ambient temperatures by exposure to climactic airflow.

19. The method of claim 12, wherein the treated wood product is selected from the group of lumber, plywood, wood particle board, oriented strand board, mineral fiber board, and modified density overlay.

20. The method of claim 12, wherein the stable aqueous wood preservative composition has been previously used and recovered from a previous wood treating process.

21. A method for preserving a wood product against fungus, insects and fire consisting essentially of the steps of preparing an aqueous solution of melamine binder resin, wherein the aqueous melamine binder resin solution is buffered at a pH of about 5.0 to about 7.5 with a phosphate buffer so that the nitrogen concentration ranges from about 17.2% to about 18.3% and the phosphate concentration ranges from about 15.7% to about 16.8%;

preparing an aqueous solution of a boron source composition selected from the group of boric acid and the water-soluble salts thereof;

forming a stable aqueous preservative solution by adding the aqueous melamine binder resin solution and an urea casein activator resin to the aqueous boron source composition solution;

treating the wood product by applying a fungicidal, insecticidal, and fire retardant amount of the stable wood preservative solution; and drying the treated wood product until the hygroscopic moisture content is below about 19%.

22. The method of claim 21, wherein the aqueous melamine binder solution is combined with the aqueous boron source composition before the urea casein activator resin is added.

23. The method of claim 21, further comprising the step of treating the wood product with the stable aqueous preservative solution under pressure.

24. The method of claim 21, further comprising the step of applying a vacuum to the wood products, prior to the pressure treating step.

25. A treated wood product containing a fire retardant, insecticidal, and fungicidal amount of a melamine polymer borate preservative, wherein the melamine polymer results from the polymerization of a melamine binder resin and an urea casein activator resin after treatment with a wood preservative composition consisting essentially of an aqueous solution of a boron source composition selected from the group of boric acid and the water-soluble salts thereof, a melamine binder resin, and a urea casein activator resin.

26. The treated wood product of claim 25 containing at least 0.17 lb/ft$^3$ of $B_2O_3$.

27. The treated wood product of claim 26, said treated wood product being substantially impervious, so as to limit the leaching of $B_2O_3$ from the treated wood product.

28. The treated wood product of claim 26, said treated wood product possessing an increased strength, after aging, when compared to an unaged, untreated wood product.

29. The treated wood product of claim 26, said treated wood product possessing a UL FR-S rating indicating a flame spread index of no greater than 25 and smoke density index rating of no greater than 25.

30. The treated wood product of claim 28, selected from the group of lumber, plywood, wood particle board, oriented strand board, mineral fiber board, and modified density overlay.

31. Treated plywood containing a fire retardant, insecticidal, and fungicidal amount of a melamine polymer borate preservative wherein said melamine polymer results from the polymerization of a melamine binder resin and an urea casein activator resin after treatment with a wood preservative composition consisting essentially of an aqueous solution of a boron source composition selected from the group of boric acid and the water-soluble salts thereof, a melamine binder resin, and a urea casein activator resin and wherein said wood preservative composition binds the laminate structure of said treated plywood.

\* \* \* \* \*